United States Patent
Cao et al.

(10) Patent No.: US 8,780,297 B2
(45) Date of Patent: Jul. 15, 2014

(54) BACKLIGHT MODULE

(75) Inventors: Qian Cao, Guangdong (CN); Poying Lin, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 547 days.

(21) Appl. No.: 12/997,714

(22) PCT Filed: Nov. 9, 2010

(86) PCT No.: PCT/CN2010/078581
§ 371 (c)(1),
(2), (4) Date: Dec. 13, 2010

(87) PCT Pub. No.: WO2012/022076
PCT Pub. Date: Feb. 23, 2012

(65) Prior Publication Data
US 2012/0044438 A1   Feb. 23, 2012

(30) Foreign Application Priority Data
Aug. 20, 2010   (CN) .......................... 2010 1 0261510

(51) Int. Cl.
*G02F 1/1335* (2006.01)
*F21V 7/04* (2006.01)

(52) U.S. Cl.
USPC ............... 349/65; 349/62; 362/612; 362/613; 362/615; 362/619

(58) Field of Classification Search
USPC ............... 349/65, 62; 362/612–613, 615–628
See application file for complete search history.

(56) References Cited

U.S. PATENT DOCUMENTS

| | | | |
|---|---|---|---|
| 2006/0087827 A1* | 4/2006 | Jung et al. | 362/29 |
| 2006/0290620 A1 | 12/2006 | Chou et al. | |
| 2010/0253883 A1* | 10/2010 | Tomizuka | 349/65 |
| 2010/0271568 A1* | 10/2010 | Jung et al. | 349/65 |
| 2010/0284202 A1* | 11/2010 | Pan et al. | 362/606 |

FOREIGN PATENT DOCUMENTS

| | | |
|---|---|---|
| CN | 101368687 A | 2/2009 |
| CN | 101660690 A | 3/2010 |
| JP | 2009229973 A | 10/2009 |

* cited by examiner

*Primary Examiner* — Bumsuk Won
*Assistant Examiner* — Charles Chang
(74) *Attorney, Agent, or Firm* — Mark M. Friedman

(57) ABSTRACT

The present invention discloses a backlight module which has a plurality of light-emitting diodes. The light-emitting diodes are divided into a plurality of light groups according to pitches between the adjacent light-emitting diodes. The light-emitting diodes with respect to a display-area center line have a position center, and the light group having the light-emitting diodes with larger pitches therebetween is in a position relatively close to the position center and is in a higher bright bin; the light group having the light-emitting diodes with smaller pitches therebetween is in a position relatively away from the position center and is in a lower bright bin. Therefore, luminous conditions of the overall light-emitting diodes tend to correspondence, and proportion of usage of light-emitting diodes in different bright bins can be increased.

6 Claims, 9 Drawing Sheets

BACKLIGHT MODULE

FIELD OF THE INVENTION

The present invention relates to a backlight module, and more particularly to a backlight module that arranges light-emitting diodes thereof according to heat-dissipating conditions of the light-emitting diodes in different positions and bright bins of the light-emitting diodes.

BACKGROUND OF THE INVENTION

A liquid crystal display (LCD) device generally comprises a backlight module and a liquid crystal panel, and has advantages of thin, low drive power and low power consumption over other display devices and has been widely used in industries of display devices. Presently, backlight modules are mainly sorted into light-emitting-diode (LED) backlight modules and cold-cathode-fluorescent-lamp (CCFL) backlight modules. Since a light-emitting-diode backlight module has an advantage of low power consumption, hence using the light-emitting-diode backlight module to replace the cold-cathode-fluorescent-lamp backlight module is now a main development trend of backlight module industries.

Based on a modular concept, most of light-emitting-diode backlight modules now install a plurality of light-emitting diodes in a light bar. Before installation, finished products of light-emitting diodes will be classified by a predetermined standard, wherein the basis for classification may be brightness, chromaticity, wavelength or forward voltage of the light-emitting diodes. Because a backlight module is required to offer a uniform light source, therefore only light-emitting diodes classified in a certain bin will be chose for installing in the light bar. Therefore, light-emitting diodes that are practically used have a low proportion of the total number of products, so that manufacturing cost of backlight module is relatively increased.

Furthermore, the light-emitting diodes in the light-emitting-diode light bars that are presently used in a backlight module are all arranged with an identical pitch. When the light bar is driven to emit lights, the light-emitting diodes in a center of the light bar inevitably will not be easy to dissipate heat compared with the light-emitting diodes in two ends of the light bar. Since temperature difference greatly affects luminous efficiency of a light-emitting diode, phenomenon of uneven heat distribution will affect the uniformity of overall luminescence of the backlight module, and also the work life of the light-emitting diodes in the center of the light bar are relatively shorter.

Hence, it is necessary to provide a backlight module to overcome the problems existing in the conventional technology.

SUMMARY OF THE INVENTION

A primary object of the invention is to provide a backlight module that light-emitting diodes thereof are arranged according to heat-dissipating conditions of the light-emitting diodes in different positions and bright bins of the light-emitting diodes.

To achieve the above object, the present invention provides a backlight module being an edge type backlight module and used in a liquid crystal display device, wherein the liquid crystal display device has a display area having a display-area center line, and the backlight module has a light guide plate and a back board, wherein the back board is correspondingly overlapped with the display area, wherein the backlight module further has:

a plurality of light-emitting diodes, wherein the light-emitting diodes are divided into a plurality of corresponding light groups according to pitches between the adjacent light-emitting diodes, and the light-emitting diodes with respect to the display-area center line have a position center, and the light group having the light-emitting diodes with larger pitches therebetween is in a position relatively close to the position center and is in a higher bright bin; the light group having the light-emitting diodes with smaller pitches therebetween is in a position relatively away from the position center and is in a lower bright bin.

In one embodiment of the present invention, the light-emitting diodes of the backlight module are divided into:

a first light group, wherein the light-emitting diodes of the first light group are positioned relatively close to the position center, and the light-emitting diodes of the first light group maintain a first pitch therebetween;

a third light group, wherein bright bin of the third light group is lower than bright bin of the first light group, and the light-emitting diodes of the third light group are positioned relatively away from the position center, and the light-emitting diodes of the third light group maintain a third pitch therebetween, wherein the third pitch is smaller than the first pitch; and a second light group, wherein bright bin of the second light group is between the bright bins of the first light group and the third light group, and the light-emitting diodes of the second light group are mounted between the first light group and the third light group, and the light-emitting diodes of the second light group maintain a second pitch therebetween, wherein the second pitch is between the first pitch and the third pitch.

In one embodiment of the present invention, the light guide plate has an incident surface; and the light-emitting diodes face the incident surface of the light guide plate.

In one embodiment of the present invention, the backlight module further has a light bar assembly, wherein the light bar assembly is mounted on the back board and faces the incident surface of the light guide plate, and the light bar assembly has at least one light bar, and the at least one light bar is mounted symmetrically with respect to the position center, and the light-emitting diodes are mounted on the at least one light bar.

In one embodiment of the present invention, the incident surface of the light guide plate is a planar surface or a jagged structural surface.

In one embodiment of the present invention, the incident surface of the light guide plate has a plurality of concave surfaces, and the concave surfaces are corresponding to the light groups, respectively, and each of the concave surfaces is separated from the corresponding light group at a distance, wherein the distance from the light group with a higher bright bin to the corresponding concave surface is longer than the distance from the light group with a lower bright bin to the corresponding concave surface.

In one embodiment of the present invention, the incident surface of the light guide plate has a plurality of convex surfaces, and the convex surfaces are corresponding to the light groups, respectively, and each of the convex surfaces is separated from the corresponding light group at a distance, wherein the distance from the light group with a higher bright bin to the corresponding convex surface is shorter than the distance from the light group with a lower bright bin to the corresponding convex surface.

In one embodiment of the present invention, the light-emitting diodes are directly mounted on the back board.

Moreover, the present invention further provides a backlight module being a direct type backlight module and used in a liquid crystal display device, wherein the liquid crystal display device has a display area having a display-area center line, and the backlight module has a back board, wherein the back board is correspondingly overlapped with the display area, wherein the backlight module further has:

a plurality of light-emitting diodes, wherein the light-emitting diodes are divided into a plurality of corresponding light groups according to pitches between the adjacent light-emitting diodes, and the light-emitting diodes with respect to the display-area center line have a position center, and the light group having the light-emitting diodes with larger pitches therebetween is in a position relatively close to the position center and is in a higher bright bin; the light group having the light-emitting diodes with smaller pitches therebetween is in a position relatively away from the position center and is in a lower bright bin.

In one embodiment of the present invention, the light-emitting diodes are mounted on the back board, and the position center of light-emitting diodes with respect to the display-area center line is in a center of the back board.

Comparing with the conventional technology, the backlight module of the present invention not only arranges different pitches for light-emitting diodes to improve heat-dissipating circumstances of the light-emitting diodes to accord luminous efficiency of all light-emitting diodes, but also increases proportions of usage of light-emitting diodes with different bright bins, and is no longer limited to the conventional technology that only light-emitting diodes with one identical bright bin are available, and thereby helps to reduce manufacturing cost of backlight modules.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1A:
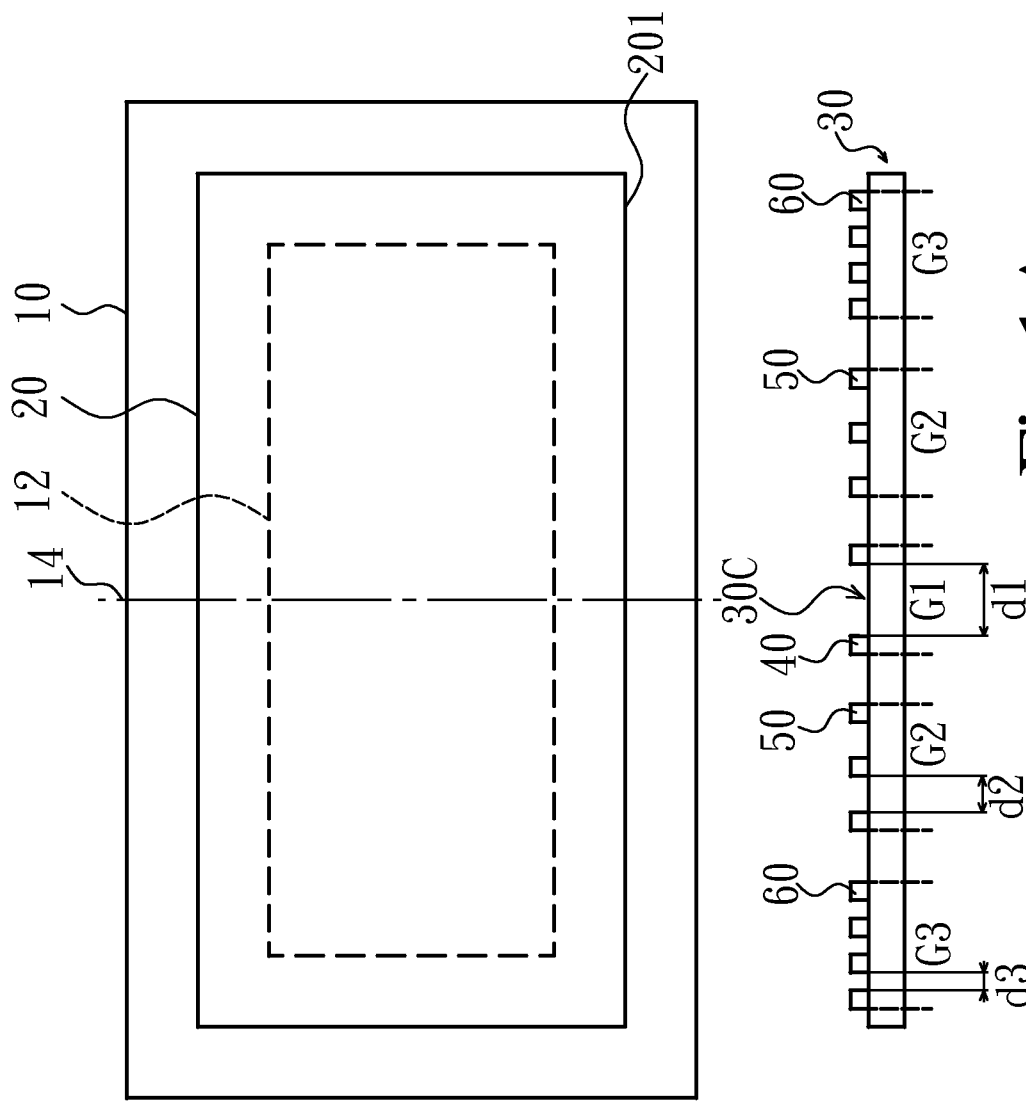
FIG. 1A is a schematic view of a backlight module according to a first embodiment of the present invention.

With reference to FIG. 1A, FIG. 1A discloses a schematic view of a backlight module according to a first embodiment of the present invention, wherein the backlight module of the first embodiment of the present invention is an edge type backlight module. In this embodiment, the backlight module has a back board 10, a light guide plate 20, a light bar assembly 30 and a plurality of light-emitting diodes 40, 50, 60. The back board 10 is correspondingly overlapped with a display area 12 of a liquid crystal display device. The light guide plate 20 is mounted on and overlapped with the back board 10 and also correspondingly overlapped with the display area 12, wherein the light guide plate 20 has an incident surface 201, in this embodiment, the incident surface 201 is a planar surface at a side of the light guide plate 20. The display area 12 has a display-area center line 14 and an incident side, wherein the incident side and the incident surface 201 is on the same side. The light bar assembly 30 is disposed on the incident side of the display area 12 and may be mounted on the back board 10 and faces the incident surface 201 of the light guide plate 20, in this embodiment, the light bar assembly 30 is constructed by a light bar. The light-emitting diodes 40, 50, 60 face the incident surface 201 of the light guide plate 20, are mounted on the light bar of the light bar assembly 30, and have a position center 30C with respect to the display-area center line 14, wherein the light bar of the light bar assembly 30 is mounted symmetrically with respect to the position center 30C. In detail, a center of the light bar corresponds to the position center 30C. The light-emitting diodes 40, 50, 60 are divided into a plurality of light groups according to pitches between the adjacent light-emitting diodes 40, 50, 60, which are a first light group G1, a second light group G2 and a third light group G3, and the light-emitting diodes 40, 50, 60 may be white light-emitting diodes, but are not limited thereto. With reference to FIG. 1A, in this embodiment, the light-emitting diodes 40 of the first light group G1 are positioned closest to the position center 30C, wherein the light-emitting diodes 40 of the first light group G1 maintain a first pitch d1 therebetween; the light-emitting diodes 50 of the second light group G2 are positioned relatively away from the position center 30C with respect to the first light group G1, wherein the light-emitting diodes 50 of the second light group G2 maintain a second pitch d2 therebetween, and the second pitch d2 is smaller than the first pitch d1; and the light-emitting diodes 60 of the third light group G3 are positioned farthest away from the position center 30C, in other words the light-emitting diodes 50 of the second light group G2 are mounted between the first light group G1 and the third group G3, wherein the light-emitting diodes 60 of the third light group G3 maintain a third pitch d3 therebetween, and the third pitch d3 is smaller than the first pitch d1 and the second pitch d2, respectively.

Figure 1B:
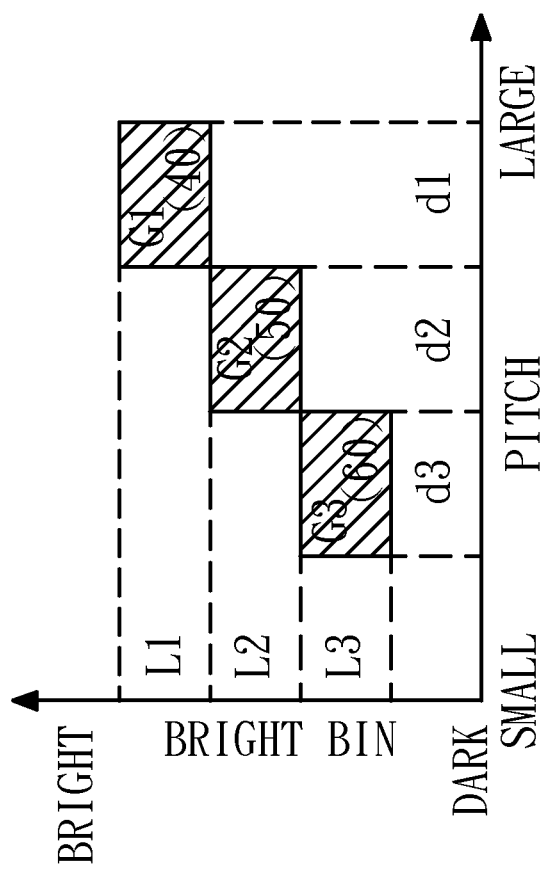
FIG. 1B is a schematic view of pitches and corresponding bright bins that light-emitting diodes of a plurality of light groups of the backlight module are corresponding to in accordance with the present invention.

With reference to FIG. 1B, FIG. 1B is a schematic view of pitches d1, d2, d3 and corresponding bright bins L1, L2, L3 that the light-emitting diodes 40, 50, 60 of the light groups G1, G2, G3 are corresponding to, wherein the light-emitting diodes 40 of the first light group G1 are in a first bright bin L1 and have the highest brightness, and the pitch d1 thereof has a largest value; the light-emitting diodes 50 of the second light group G2 are in a second bright bin L2 and have the secondary brightness, and the pitch d2 thereof has a secondary value; the light-emitting diodes 60 of the light group G3 are in a third bin L3 and have the lowest brightness, and the pitch d3 thereof has a smallest value.

Figure 2:
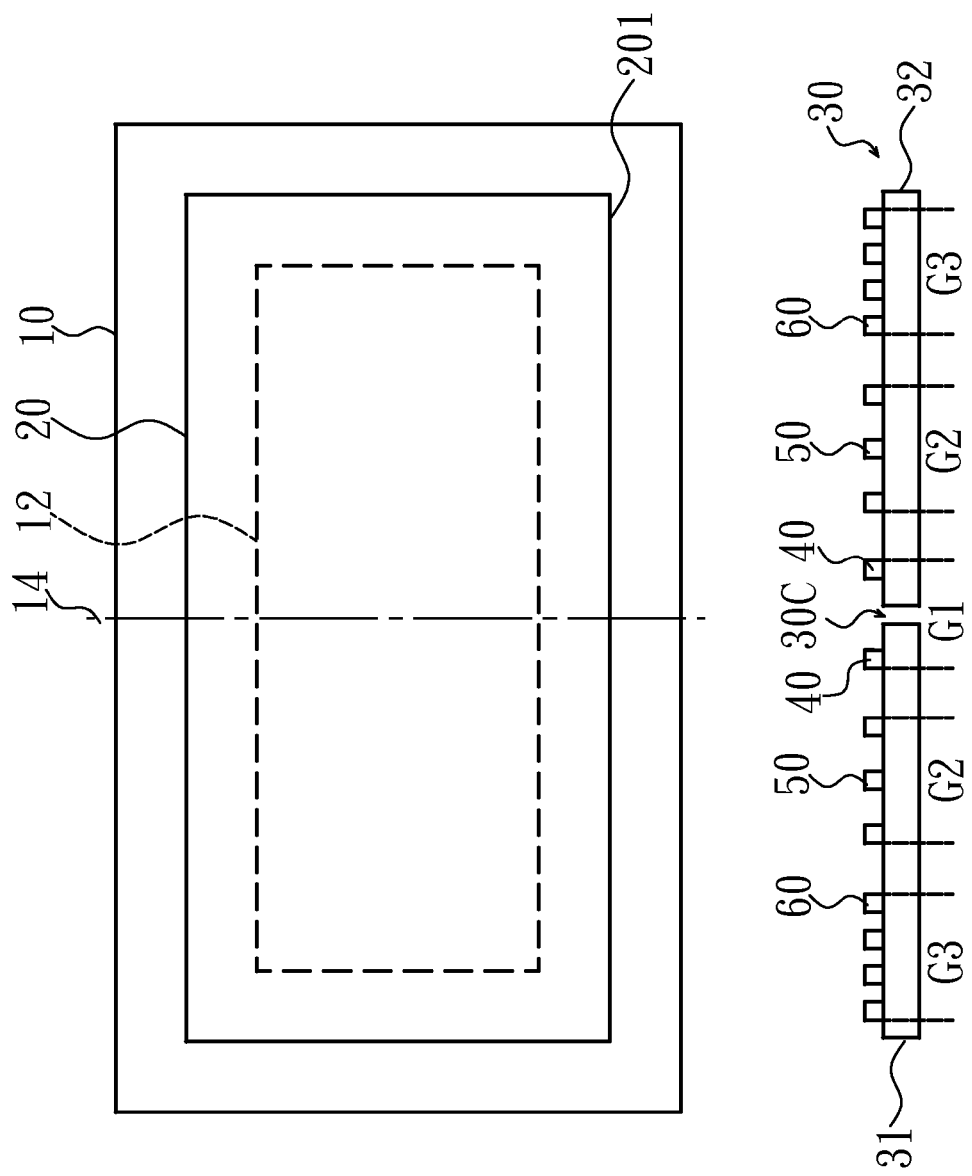
FIG. 2 is a schematic view of the backlight module according to a second embodiment of the present invention.

With reference to FIG. 2, FIG. 2 is a schematic view of the backlight module according to a second embodiment of the present invention. The backlight module of the second embodiment of the present invention is similar to the first embodiment of the present invention, so as to use similar terms and numerals of the first embodiment, but the difference of the second embodiment is characterized in that: the light bar assembly 30 has two light bars 31, 32, wherein the light bars 31, 32 are mounted symmetrically with each other with respect to the position center 30C, in detail, the position center 30C is in a middle between the light bars 31, 32. The light-emitting diodes 40 of the first light group G1, the light-emitting diodes 50 of the second light group G2 and the light-emitting diodes 60 of the third light group G3 are arranged on the light bars 31, 32 in the same arrangement as in the first embodiment. The embodiments shown in FIGS. 2 and 1A do not limit the number of the light bars that the light bar assembly includes.

Figure 3:
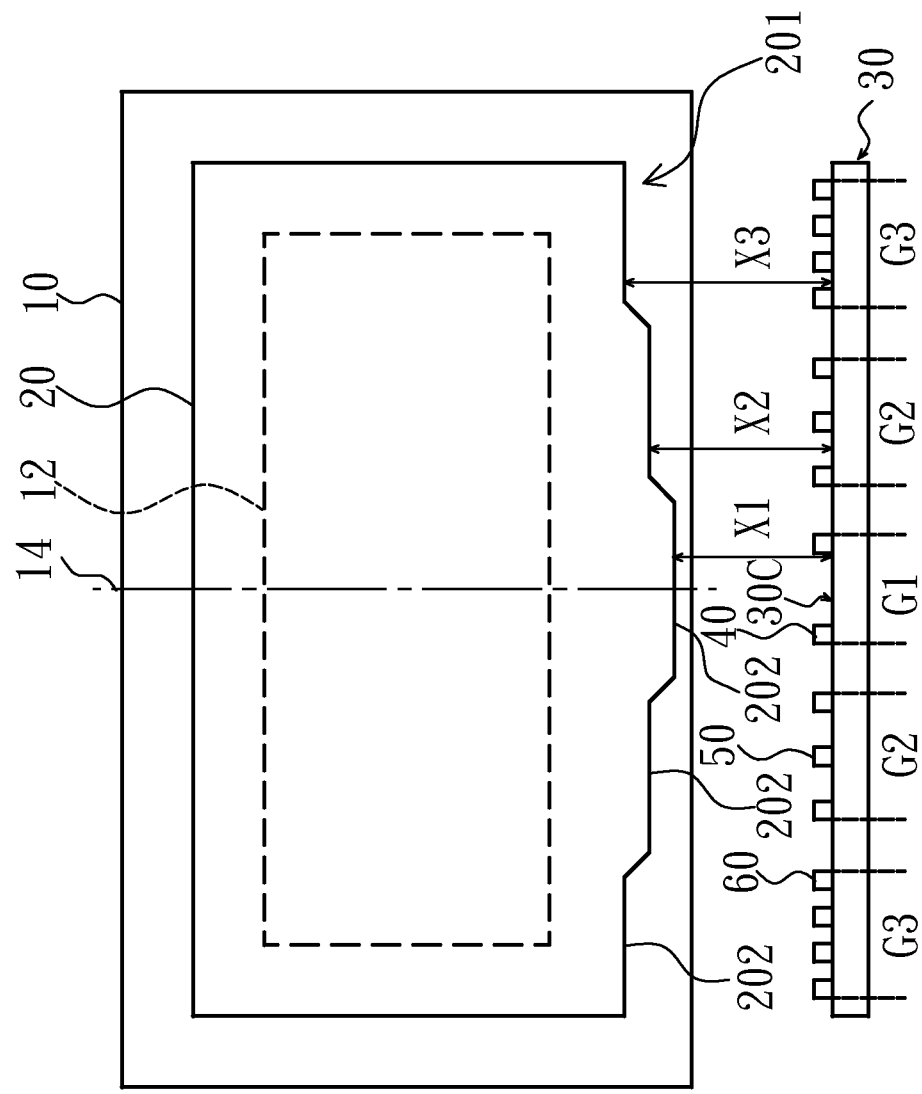
FIG. 3 is a schematic view of the backlight module according to a third embodiment of the present invention.

With reference to FIG. 3, FIG. 3 is a schematic view of the backlight module according to a third embodiment of the present invention, wherein the backlight module of the third embodiment of the present invention is similar to the first embodiment of the present invention, so as to use similar terms and numerals of the first embodiment, but the difference of the third embodiment is characterized in that: the incident surface 201 of the light guide plate 20 has a plurality of convex surfaces 202. Furthermore, in this embodiment, the convex surfaces 202 are corresponding to the light groups G1, G2, G3, respectively, and each of the convex surfaces 202 is separated from the corresponding light group G1, G2, G3 at a distance X1, X2, X3, wherein the distance X1 from the first light group G1 with the higher bright bin to the corresponding convex surface 202 is relatively shorter than the distance X2 from the second light group G2 with the secondary bright bin to the corresponding convex surface 202, meanwhile, the distance X2 is relatively shorter than the distance X3 from the third light group G3 with the lowest bright bin to the corresponding convex surface 202.

Figure 4:
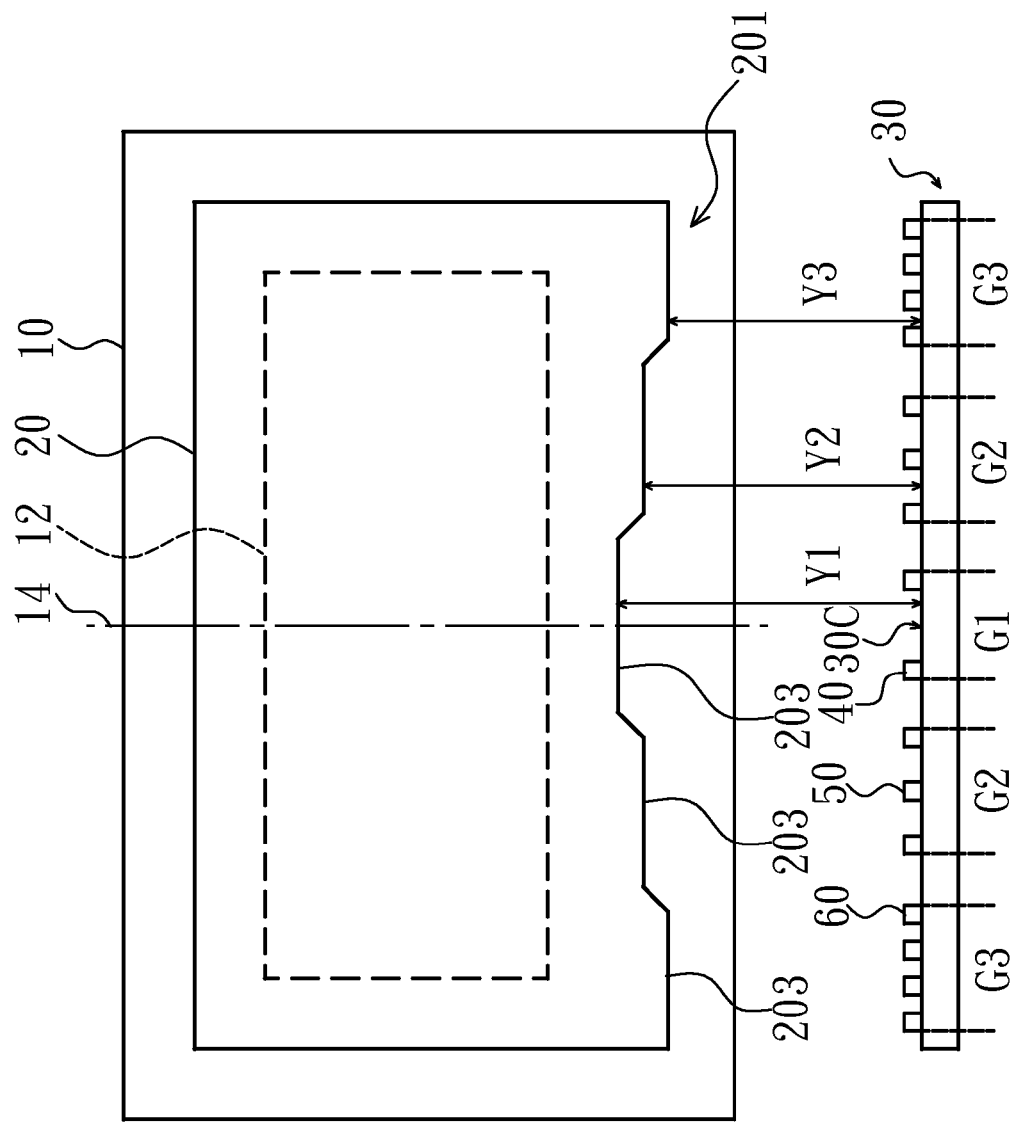
FIG. 4 is a schematic view of the backlight module according to a fourth embodiment of the present invention.

With reference to FIG. 4, FIG. 4 is a schematic view of the backlight module according to a fourth embodiment of the present invention, wherein the backlight module of the fourth embodiment of the present invention is similar to the first embodiment of the present invention, so as to use similar terms and numerals of the first embodiment, but the difference of the fourth embodiment is characterized in that: the incident surface 201 of the light guide plate 20 has a plurality of concave surface 203. Furthermore, the concave surfaces 203 are corresponding to the light groups G1, G2, G3, respectively, and each of the concave surfaces 203 is separated from the corresponding light group G1, G2, G3 at a distance Y1, Y2, Y3, wherein the distance Y1 from the first light group G1 with the higher bright bin to the corresponding concave surface 203 is relatively longer than the distance Y2 from the second light group G2 with the secondary bright bin to the corresponding concave surface 203, meanwhile, the distance Y2 is relatively longer than the distance Y3 from the third light group G3 with the lowest bright bin to the corresponding concave surface 203.

Figure 5:
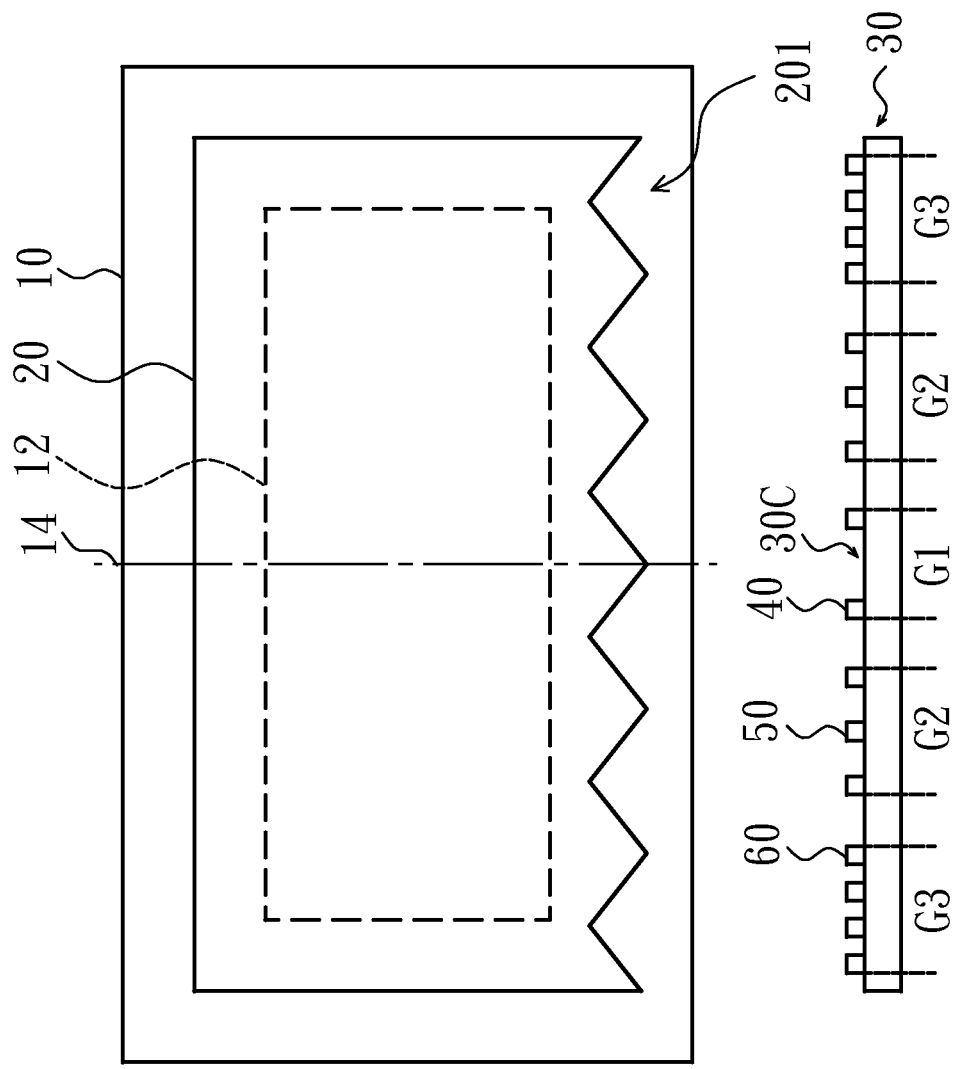
FIG. 5 is a schematic view of the backlight module according to a fifth embodiment of the present invention.

With reference to FIG. 5, FIG. 5 is a schematic view of the backlight module according to a fifth embodiment of the present invention, wherein the backlight module of the fifth embodiment of the present invention is similar to the first embodiment of the present invention, so as to use similar terms and numerals of the first embodiment, but the difference of the fifth embodiment is characterized in that: the incident surface 201 of the light guide plate 20 is a jagged structural surface, wherein a distance from the first light group G1 with the higher bright bin to the corresponding jagged structure is substantially equal to a distance from the second light group G2 with the secondary bright bin to the corresponding jagged structure, and is substantially equal to a distance from the third light group G3 with the lowest bright bin to the corresponding jagged structure.

Figure 6:
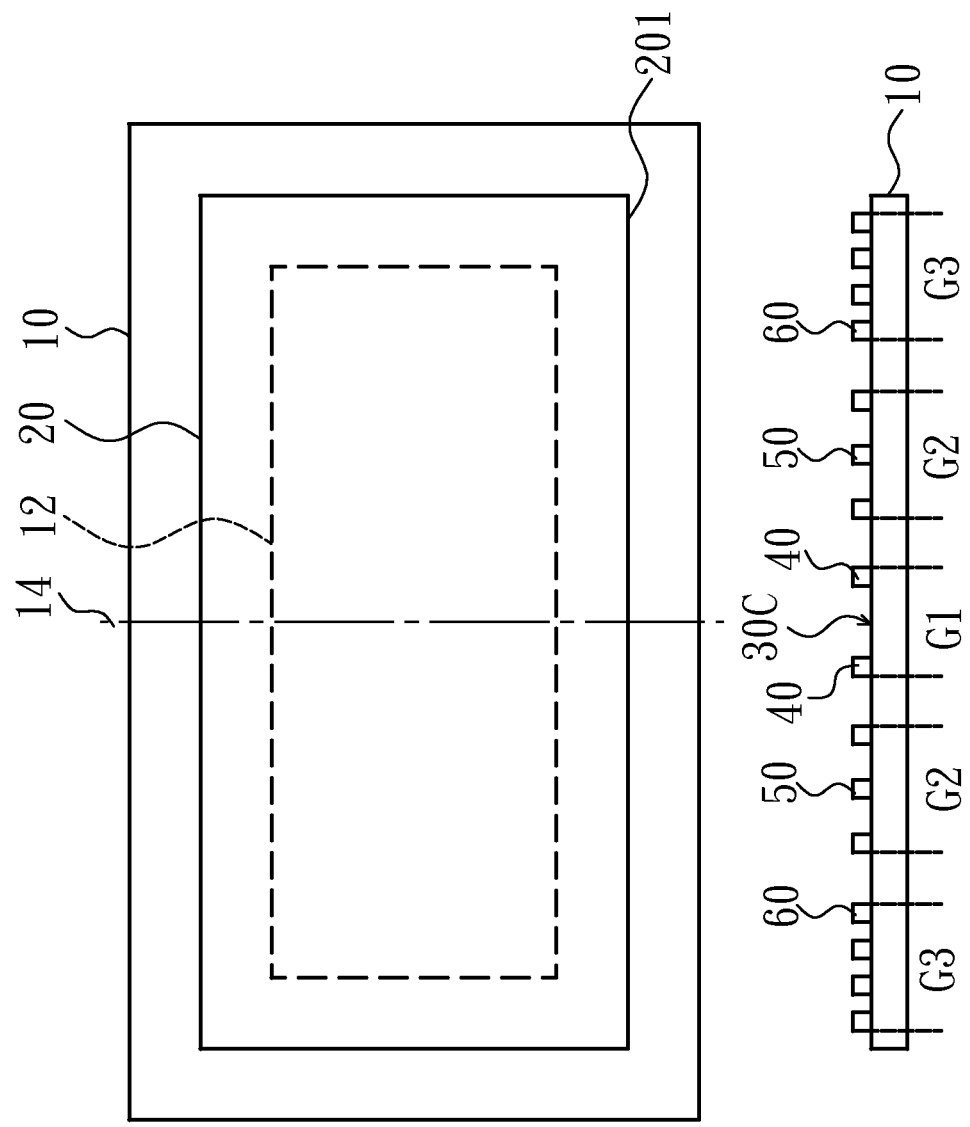
FIG. 6 is a schematic view of the backlight module according to a sixth embodiment of the present invention.

With reference to FIG. 6, FIG. 6 is a schematic view of the backlight module according to a sixth embodiment of the present invention, wherein the backlight module of the sixth embodiment of the present invention is also an edge type backlight module, and is similar to the first embodiment of the present invention, so as to use similar terms and numerals of the first embodiment, but the difference of the sixth embodiment is characterized in that: the backlight module only has a backboard 10, a light guide plate 20 and a plurality of light-emitting diodes 40, 50, 60, wherein the light-emitting diodes 40, 50, 60 are directly mounted on the back board 10 and are mounted on a side frame which is bended perpendicularly and extended upwardly from a side edge of the back board 10 to face the incident surface 201 of the light guide plate 20.

Figure 7:
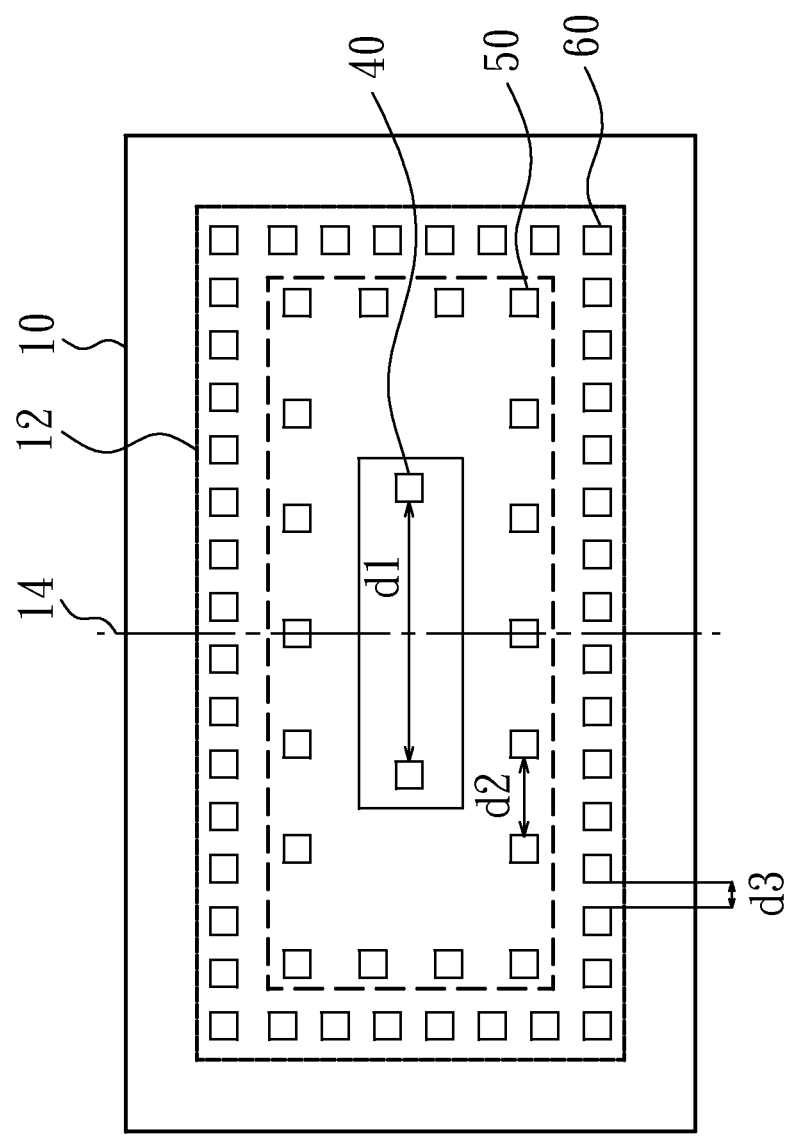
FIG. 7 is a schematic view of the backlight module according to a seventh embodiment of the present invention.

With reference to FIG. 7, FIG. 7 is a schematic view of the backlight module according to a seventh embodiment of the present invention, wherein the backlight module of the seventh embodiment of the present invention is a direct type backlight module which comprises a back board 10 and a plurality of light-emitting diodes 40, 50, 60. The back board 10 is correspondingly overlapped with a display area 12 of a liquid crystal display device. The display area 12 has a display-area center line 14. The light-emitting diodes 40, 50, 60 are mounted on the back board 10 or light bars, wherein the light-emitting diodes 40, 50, 60 have a position center 30C corresponding to the display-area center line 14, in this embodiment, the position center 30C that is defined by the light-emitting diodes 40, 50, 60 corresponding to the display-area center line 14 is substantially in a center of the back board 10.

In the seventh embodiment of the present invention, the light-emitting diodes 40, 50, 60 are also divided into a plurality of corresponding light groups according to the classification shown in FIG. 1B, which are a first light group G1, a second light group G2 and a third light group G3 in this embodiment. The light-emitting diodes 40 of the first light group G1 are positioned closest to the position center 30C, wherein the light-emitting diodes 40 of the first light group G1 maintain a first pitch d1 therebetween; the light-emitting diodes 50 of the second light group G2 are positioned farther away from the position center 30C with respect to the first light group G1, wherein the light-emitting diodes 50 of the second light group G2 maintain a second pitch d2 therebetween; and the light-emitting diodes 60 of the third light group G3 are positioned farthest away from the position center 30C, in other words the light-emitting diodes 50 of the second light group G2 are mounted between the first light group G1 and the third group G3, wherein the light-emitting diodes 60 of the third light group G3 maintain a third pitch d3 therebetween. Furthermore, the light-emitting diodes 40 of the first light group G1 are in a first bright bin L1 and have the highest brightness, and the pitch d1 thereof has a largest value; the light-emitting diodes 50 of the second light group G2 are in a second bright bin L2 and have the secondary brightness, and the pitch d2 thereof has a secondary value; and the light-emitting diodes 60 of the light group G3 are in a third bin L3 and have the lowest brightness, and the pitch d3 thereof has a smallest value. This embodiment does not particularly limit the number of the light-emitting diodes 40, 50, 60.

Figure 8B:
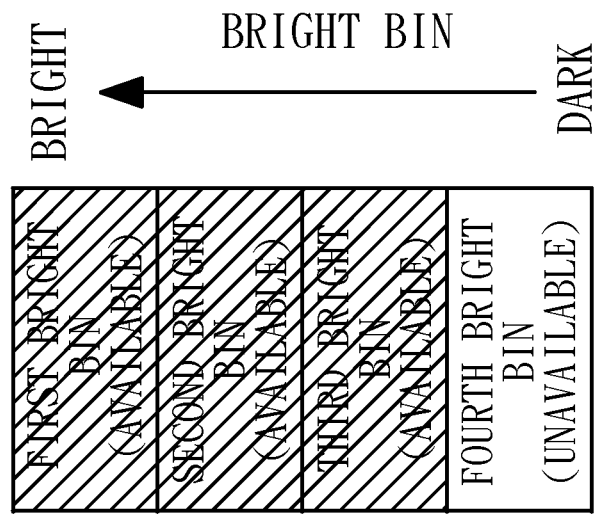
FIG. 8B is schematic view of selection for light-emitting diodes with different bright bins according to the present invention.
Figure 8A:
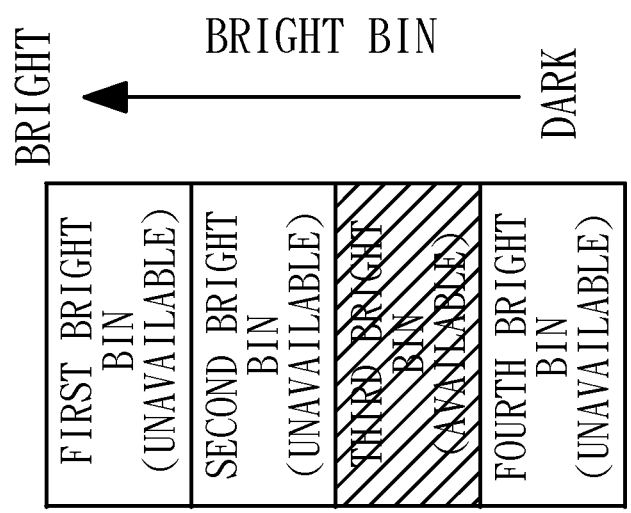
FIG. 8A is schematic view of selection for light-emitting diodes with different bright bins according to a conventional technology.

Because the heat-dissipating condition of the light-emitting diodes close to the center position is relatively worse than the light-emitting diodes away from the center position, the present invention then arranges the pitches between the light-emitting diodes close to the center position to be relatively larger than the pitches between the light-emitting diodes away from the center position, so as to reduce the difference of the heat-dissipating condition between the light-emitting diodes close to the center position and away from the center position to accord luminous efficiency of all of the light-emitting diodes. Furthermore, with reference to FIGS. 8A and 8B, FIGS. 8A and 8B are schematic views of selection for light-emitting diodes with different bright bins according to a conventional technology and the present invention, respectively. With reference to FIG. 8A, since the conventional technology classifies light-emitting diodes for mounting on a backlight module only according to the bright bins, only the light-emitting diodes in the third bright bin are available for the backlight module. But, with reference to FIG. 8B, the present invention mounts light-emitting diodes with different bright bins according to different conditions of pitch, i.e. different conditions of heat dissipation, to maintain the uniformity of overall brightness, so that light-emitting diodes in a first bright bin, a second bright bin and a third bright bin are available for the backlight module. Therefore, the present invention can effectively increase the usage of selected light-emitting diodes to reduce cost when manufacturing backlight modules.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module being an edge type backlight module and used in a liquid crystal display device, wherein the liquid crystal display device has a display area having a display-area center line, and the backlight module has a light guide plate and a back board, wherein the back board is correspondingly overlapped with the display area, characterized in that: the backlight module further comprises a plurality of light-emitting diodes, wherein the light-emitting diodes face an incident surface of the light guide plate, and the light-emitting diodes with respect to the display-area center line have a position center, and according to pitches between the adjacent light-emitting diodes, the light-emitting diodes are divided into: a first light group, wherein the light-emitting diodes of the first light group are positioned relatively close to the position center, and the light-emitting diodes of the first light group maintain a first pitch therebetween;
  a third light group, wherein bright bin of the third light group is lower than bright bin of the first light group, and the light-emitting diodes of the third light group are positioned relatively away from the position center, and the light-emitting diodes of the third light group maintain a third pitch therebetween, wherein the third pitch is smaller than the first pitch; and
  a second light group, wherein bright bin of the second light group is between the bright bins of the first light group and the third light group, and the light-emitting diodes of the second light group are mounted between the first light group and the third light group, and the light-emitting diodes of the second light group maintain a second pitch therebetween, wherein the second pitch is between the first pitch and the third pitch, wherein the incident surface of the light guide plate has a plurality of concave surfaces or has a plurality of convex surfaces excluding being a jagged structural surface with a plurality of sharp edges, wherein each of the concave surfaces is flat and has a height being different from the height of the adjacent concave surfaces; the concave surfaces are corresponding to the light groups, respectively, and each of the concave surfaces is separated from the corresponding light group at a distance, wherein the distance from the light group with a higher bright bin to the corresponding concave surface is longer than the distance from the light group with a lower bright bin to the corresponding concave surface; each of the convex surfaces is flat and has a height being different from the height of the adjacent convex surfaces; the convex surfaces are corresponding to the light groups, respectively, and each of the convex surfaces is separated from the corresponding light group at a distance, wherein the distance from the light group with a higher bright bin to the corresponding convex surface is shorter than the distance from the light group with a lower bright bin to the corresponding convex surface.

2. The backlight module as claimed in claim 1, characterized in that: the backlight module further has a light bar assembly, wherein the light bar assembly is mounted on the back board and faces the incident surface of the light guide plate, and the light bar assembly has at least one light bar, and the at least one light bar is mounted symmetrically with respect to the position center, and the light-emitting diodes are mounted on the at least one light bar.

3. The backlight module as claimed in claim 1, characterized in that: the light-emitting diodes are directly mounted on the back board.

4. A backlight module being an edge type backlight module and used in a liquid crystal display device, wherein the liquid crystal display device has a display area having a display-area center line, and the backlight module has a light guide plate and a back board, wherein the back board is correspondingly overlapped with the display area, characterized in that: the backlight module further comprises:
  a plurality of light-emitting diodes, wherein the light-emitting diodes are divided into a plurality of corresponding light groups according to pitches between the adjacent light-emitting diodes, and the light-emitting diodes with respect to the display-area center line have a position center, and the light group having the light-emitting diodes with larger pitches therebetween is in a position relatively close to the position center and is in a higher bright bin; the light group having the light-emitting diodes with smaller pitches therebetween is positioned relatively away from the position center and is in a lower bright bin, wherein the light guide plate has an incident surface; and the light-emitting diodes face the incident surface of the light guide plate; the incident surface of the light guide plate has a plurality of concave surfaces or has a plurality of convex surfaces excluding being a jagged structural surface with a plurality of sharp edges, wherein each of the concave surfaces is flat and has a height being different from the height of the adjacent concave surfaces; the concave surfaces are corresponding to the light groups, respectively, and each of the concave surfaces is separated from the corresponding light group at a distance, wherein the distance from the light group with a higher bright bin to the corresponding concave surface is longer than the distance from the light group with a lower bright bin to the corresponding concave surface; each of the convex surfaces is flat and has a height being different from the height of the adjacent convex surfaces; the convex surfaces are corresponding to the light groups, respectively, and each of the convex surfaces is separated from the corresponding light group at a distance, wherein the distance from the light group with a higher bright bin to the corresponding convex surface is shorter than the distance from the light group with a lower bright bin to the corresponding convex surface.

5. The backlight module as claimed in claim 4, characterized in that: the backlight module further has a light bar assembly, wherein the light bar assembly is mounted on the back board and faces the incident surface of the light guide plate, and the light bar assembly has at least one light bar, and the at least one light bar is mounted symmetrically with respect to the position center, and the light-emitting diodes are mounted on the at least one light bar.

6. The backlight module as claimed in claim 4, characterized in that: the light-emitting diodes are directly mounted on the back board.

* * * * *